M. W. INGRAHAM.
BED.
APPLICATION FILED DEC. 13, 1909.
984,001.
Patented Feb. 14, 1911.
2 SHEETS—SHEET 1.
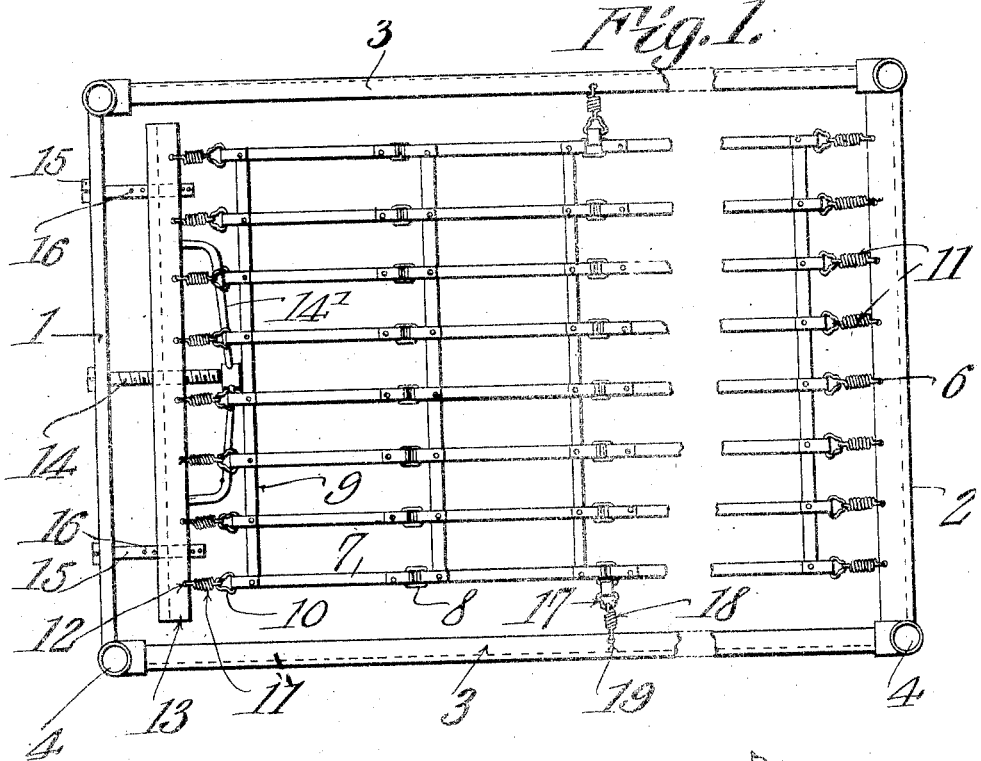
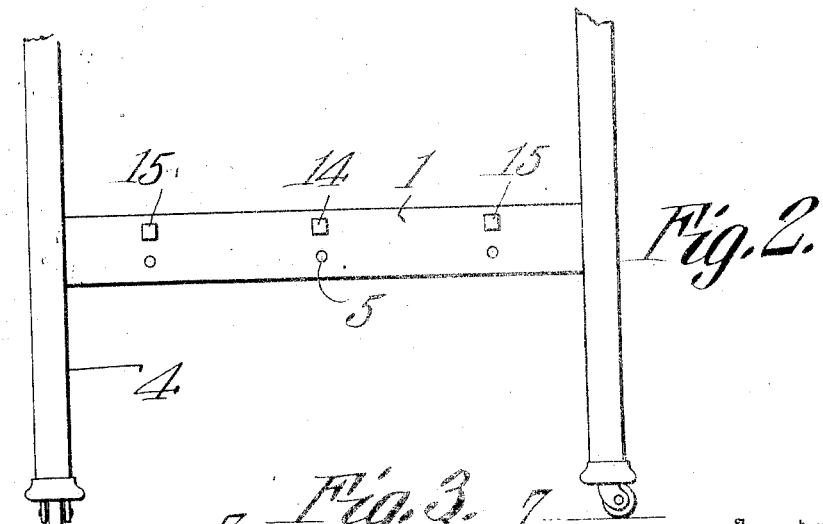
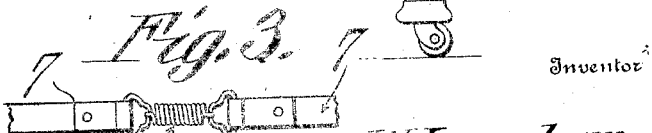
Witnesses
Inventor
Matthew W. Ingraham
By C. A. Snow & Co.
Attorneys M. W. INGRAHAM.
BED.
APPLICATION FILED DEC. 13, 1909.
984,001.
Patented Feb. 14, 1911.
2 SHEETS—SHEET 2.
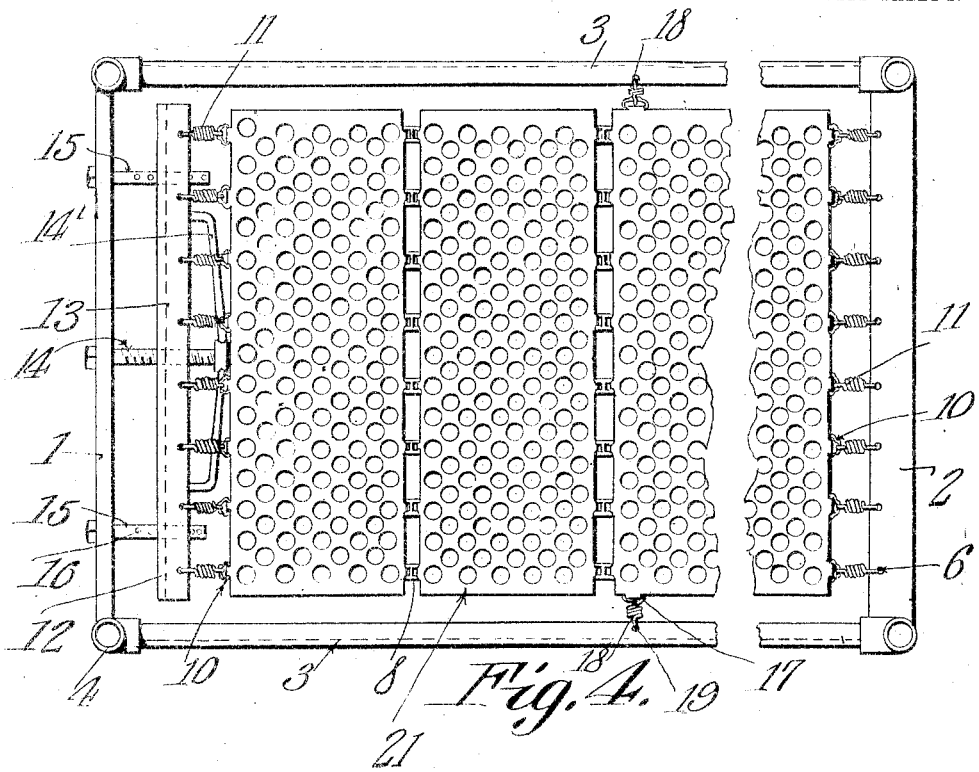
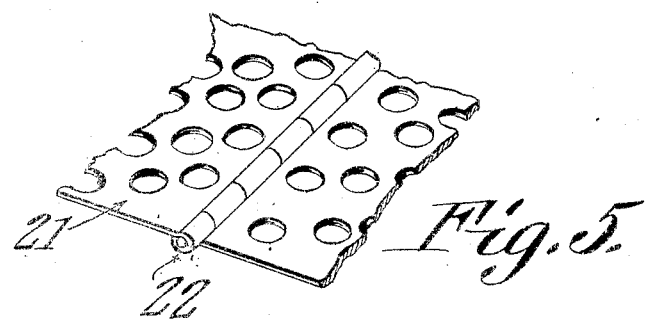

UNITED STATES PATENT OFFICE.

MATTHEW W. INGRAHAM, OF GLACE BAY, NOVA SCOTIA, CANADA.

BED.

984,001.

Specification of Letters Patent. Patented Feb. 14, 1911.

Application filed December 13, 1909. Serial No. 532,836.

*To all whom it may concern:*

Be it known that I, MATTHEW W. INGRAHAM, a citizen of the United States, residing at Glace Bay, in the Province of Nova Scotia, Dominion of Canada, have invented new and useful Beds, of which the following is a specification.

This invention has reference to improvements in beds but more particularly relates to the bed bottom and supports therefor.

In accordance with the present invention there is provided an elastically supported bed bottom of sectional character so that the bed bottom when removed from the bed frame may be readily folded into small compass and is so constructed that in the event of any portion becoming broken or damaged such portion may be readily removed and replaced by a new portion of like character.

The invention also comprises other features which will be better understood from a consideration of the following detail description taken in connection with the accompanying drawings forming a part of this specification, in which drawings, Figure 1 is a plan view of a bed frame with the bed bottom attached thereto. Fig. 2 is an end elevation of the bed frame. Fig. 3 is a detail view of a slightly modified form of the structure shown in Fig. 1. Fig. 4 is a plan view of a different form of bed bottom from that shown in Fig. 1, and embodying the invention. Fig. 5 is a detail view of a different form of hinge than shown in Fig. 4. Fig. 6 is a detail section of a modified form of a part of the structure of Figs. 1 and 4.

Referring to the drawings there is shown a bed frame composed of end pieces 1, 2, and side pieces 3, the frame being supported upon legs 4 in the usual manner. The end piece 1 is formed with two rows of perforations 5 one above the other. The end 2 is provided with a longitudinal series of perforations 6.

The bed bottom, as shown in Fig. 1, is made up of longitudinal strips each composed of short members 7 coupled together at their meeting ends by hinges 8 which may be in the form of closed loops with a central strengthening member. All the members 7 may be joined by cross strips 9 extending entirely across the said bottom and riveted or otherwise secured to the members 7. The cross members 9 connect the corresponding sections 7 of the longitudinal members of the said bottom into groups each of which groups is hinged to another group, the hinges extending crosswise of the bed frame in the particular structure shown in the drawings.

It will be understood that one or more cross members may be used with each group of members 7, or these cross members may even be omitted for the purpose of cheapening the construction of the bed bottom. The end members 7 of the said bottom are formed with clevis-like loops 10 each receiving one end of a short helical spring 11 the other end of which at one end of the bed bottom is secured in a perforation 6 in the end 2 of the bed frame, while the end of each helical spring remote from the sections 7 at the other end of the bed bottom, is secured in a perforation 12 in a cross bar 13 serving to put the entire bed bottom under equal strain throughout. This cross bar has passed through it about midway of its length the threaded end of a bolt or screw 14 taking into a threaded boss at the center of a spring yoke 14'. The bolt 14 extends through one of the central perforations 5 of the series of perforations in the end 1 and extending through the end perforations of the corresponding one of these series are pins 15 also extending through appropriate perforations in the bar 13, and these pins 15 are each provided with a longitudinal series of perforations 16 for the reception of a suitable locking pin 16' designed to engage the inner edge of the bar 13 when the bed bottom is subjected to a predetermined weight. In other words, when the bolt 14 is turned in one direction, it pulls on the bar 13 through the yoke 14', this yoke yielding to a greater or less extent because of its resilient nature. Pins 16' are then inserted into certain of the openings 16 between the bar 13 and the strips 7 so that, when the bed bottom is subjected to a predetermined weight, the bar 13 will be pulled along the guides 15 until further movement of the bar is stopped by the pins 16'. During this sliding movement of the bar on the guide pins 15, the yoke 14' will yield but, after the bar has been brought to a stop by the pins 16', the entire yielding action will occur in the springs 11.

From the foregoing it will be noted that when a weight is first applied to the bed bottom, both the springs 11 and the spring yoke 14' will give but, after the yoke 14' has yielded to its greatest extent, this yielding action is reduced by the elimination of the yoke 14'. Importance is attached to the fact that, should the yoke 14' break from any cause, the bar 13 will be prevented from pulling off of the guide pins 15 by the stop pins 16'. While these pins 15 are shown as headed at the outer end to engage the outer face of the bar 1 of the bed frame, it will be understood that other securing means for these pins may be provided.

At appropriate points along the outer longitudinal members of the bed bottom are clevises 17 each receiving one end of a helical spring 18, the other end of which is secured in an appropriate perforation in the corresponding side bar 3 of the bed frame.

By replacing any or all the rows of hinges 8 with helical springs as indicated at 20 in Fig. 3 the bed bottom may be made as elastic as desired.

The different rows of perforations 5 in the end member 1 of the bed frame provide means for elevating or depressing the corresponding end of the bed bottom as may be found expedient. While but two rows of perforations 5 are shown in the drawings it will be understood that one row may be employed or more than two rows may be provided.

With a bed constructed as described any desired degree of elasticity may be imparted to the bed bottom by means of the straining bar 13 and the corresponding end of the bed bottom may be elevated or may be depressed as may be found desirable. Furthermore the bed bottom is foldable into a small compass thus facilitating storage or transportation. Moreover, if a portion of the bed bottom becomes damaged it is easily replaced without the necessity of obtaining an entirely new bed bottom.

Instead of constructing the bed bottom of strips 7 and 9, it may be made of sheets 21 of perforated or reticulated steel connected together at the meeting edges by hinges 8, as shown in Fig. 4, or by hinges 22 of the piano type, as indicated in Fig. 5.

The sheets 21 may be of any desired area and the hinge connections may be of any suitable construction including the form shown in Fig. 3. The perforations of the sheets 21 shown in the drawings are to be taken as illustrative only since any style or arrangement of the perforations may be used.

Instead of providing the pins 15 with perforations and locking the bar 13 with other pins adapted to the perforations, each pin 15 may have a longitudinal series of teeth 23 formed along one side and a pawl 24 may be carried by the bar 13 in operative relation to the teeth 23 so that when the bar 13 is moved by the screw 14 the pawls 24 will click over the teeth 23 and lock the bar in the adjusted position.

What is claimed is:

The combination with a bed frame, of guide pins extending inwardly from one end thereof, a bar slidably mounted on the pins, a spring yoke extending inwardly from the bar, threaded means loosely and revolubly mounted within the bar and said end of the frame and engaging the yoke to shift said yoke and the bar in one direction, stop pins adjustably engaging the guide pins for limiting the movement of the bar away from said end of the frame, a bed bottom, and spring connections between the bed bottom and the bar and the other end of the frame respectively.

In testimony that I claim the foregoing as my own, I have hereto affixed my signature in the presence of two witnesses.

MATTHEW W. INGRAHAM.

Witnesses:
JOHN J. MCKENZIE,
JOHN A. MCLEOD.